Patented July 30, 1940

2,209,451

UNITED STATES PATENT OFFICE 2,209,451

ACOUSTIC CEMENT

Harvey D. Geyer, Dayton, Ohio, assignor to General Motors Corporation, Detroit, Mich., a corporation of Delaware No Drawing. Application February 10, 1938, Serial No. 189,810

5 Claims. (Cl. 260—724)

This invention relates to an elastic sound-deadening or acoustic material adapted to be applied as a layer upon an automobile fender or body panel, or the like, to greatly lessen sound vibrations or drumming noises therein.

This application is a continuation in part of my copending application Serial No. 155,695, filed July 26, 1937.

An object of this invention is to provide such a material in the form of a viscous rubber cement which may be first applied in liquid form, as by spraying or brushing, and which may thereafter be heated in situ to form a strongly adhering spongy elastic solid layer of substantial thickness upon the treated surface of the panel or the like.

A more specific object is to provide an economically made viscous rubber cement containing reinforcing fibrous material and capable upon being heated in situ and forming a strongly adhering elastic spongy solid layer of substantial thickness.

Further objects and advantages of the present invention will be apparent from the following description.

The material of this invention is adapted to be applied to the under side of automobile fenders or to the inner or concealed sides of sheet metal panels of automobile bodies or the like to eliminate, deaden or absorb drumming noises or any other undesired vibrations therein.

The following specific compound is given as an illustrative example of the material of this invention:

| | Per cent |
|---|---|
| (1) Rubber (preferably crude and reclaimed rubber in proportions of 8.82% and 15.68% respectively) | 24.50 |
| (2) Rosin or other tack producing gums such as coumarone, tragacanth, etc. | 59.40 |
| (3) Whiting or other filler pigments such as carbon black, zinc oxide, clay, etc. or mixtures thereof | 7.46 |
| (4) Stearic acid or other fatty acids such as, oleic or palmitic acids also glacial acetic acid may be used | 1.96 |
| (5) Ammonium carbonate or other blowing agents such as, sodium bicarbonate, potassium bicarbonate or other compounds which pyrolize at low temperatures | 4.72 |
| (6) Cotton, asbestos, or other fiber or fibrous material | 1.96 |
| | 100.00 |

Ingredients numbered 1, 3 and 4 are thoroughly mixed and worked together on a rubber mill in the same manner as ordinary rubber compounds until a soft plastic homogeneous compound is formed. This compound is then mixed with and dissolved in gasoline together with the rosin in the proportion of about 1 lb. of compound and resin to 1 pint of gasoline to form a quite fluid liquid compound of such consistency that it may be applied by spraying in a spray gun, or brushing it on with a brush. The fluid compound is next strained and cooled and then ingredients numbers 5 and 6 are added with stirring. It is important that the liquid is nearly at room temperature when the ammonium carbonate is added to prevent any decomposition of the same. The proportions given above obviously may be varied to a material extent dependent upon the specific characteristics desired for any specific use also the alternative ingredients may be substituted for the preferred ingredients in the mix with equal success. The resultant compounded adhesive is especially suitable for use on automobile sheet metal body panels for deadening sound vibrations.

A feature of the compound of this invention is the addition of a blowing agent (ammonium carbonate, etc.) which will "blow" or emit gas when the material is subjected to the heating step and thus provide in a simple manner a final porous or spongy light weight elastic layer of substantial thickness.

The viscous liquid material may be applied by spraying or brushing and gives best results when applied to a thickness of about three thirty-seconds of an inch. The applied layer or coating is then air dried, preferably at room temperature, for a time period sufficient for most of the gasoline (or other solvent which may be used) to evaporate. This drying operation reduces the original thickness of the applied coating about 50%. This drying operation is desirable but not essential and may be omitted.

The dried and applied coating is next heated to a temperature of about 280° F., preferably in an oven, for about 30 minutes. This heating causes the ammonium carbonate, sodium bicarbonate, or other unstable compound to "blow" or slowly give off gas bubbles and thereby provide a light-weight cellular or spongy final layer of substantially increased thickness due to such "blowing." The temperature and time period of heat treatment may be varied in order to provide a harder or more elastic final layer to better fit the specific conditions of use in any given case. It is apparent that the aforementioned steps of air drying and heating may be combined, providing the heating is carried out by a slow rise in temperature and thus substantially preventing the formation of bubbles or blisters.

This invention provides a very simple and economical method of providing a strongly-adhering layer of elastic spongy rubber-like material on any metal, wood, or other surface, since the material can be very readily applied in liquid form and then heated in situ into its final elastic spongy form at a fairly low temperature.

The function of the cotton or other fiber is to greatly reinforce and strengthen the final spongy layer, and also to properly hold the material together during "blowing" thereof whereby the "blowing" may be carried to a greater degree without causing excessive irregularities in the surface of the layer. The average fiber length of the fibrous material should be sufficiently short to prevent the fibers from balling up during application of the liquid material with a spray gun or brush.

Obviously the material of this invention may be advantageously used for purposes other than sound-deadening purposes, for instance, for sealing up small crevices or apertures due to its swelling action during the final cure.

While the embodiment of the present invention as herein disclosed, constitutes a preferred form, it is to be understood that other forms might be adopted, all coming within the scope of the claims which follow.

What is claimed is as follows:

1. An elastic porous adhesive material capable of deadening sound vibrations when applied as a layer to a metal panel or the like, comprising, a homogeneous rubber base, rosin in quantities of from 2 to 3 times the weight of the rubber and a blowing agent, said rubber being about 25% of the total weight of the coating.

2. An elastic porous adhesive material capable of deadening sound vibrations when applied as a layer to a metal panel or the like, comprising, a homogeneous spongy base of rubber consisting of from 20 to 30% of the total weight of the material, tack producing gums in the order of from 55 to 65% and suitable fibers and fillers from 10 to 20%.

3. A porous elastic adhesive material capable of deadening sound vibrations when applied as a layer upon a metal panel or the like, said material consisting of, a homogeneous spongy rubber base, rosin, pigment fillers, fatty acids, ammonium carbonate, and fibrous material, said constituents being present in quantities approximating, rubber 20 to 30 parts, rosin 55 to 65 parts, pigment fillers 6 to 9 parts, fatty acids 1 to 3 parts, ammonium carbonate 3 to 6 parts and fibrous material 1 to 3 parts, said quantities being in parts by weight of the product.

4. An elastic adhesive material, comprising; a homogeneous rubber base, rosin in quantities from 2 to 3 times the weight of rubber, and a blowing agent, said rubber being about 25% of the total weight of the coating, said elastic adhesive material being adapted to form an elastic spongy layer when applied to metal surfaces or the like and heated in situ thereupon.

5. An elastic adhesive material, comprising; a homogeneous rubber base, rosin in quantities from 2 to 3 times the weight of the rubber and a blowing agent, said material being adapted to form a spongy elastic layer when applied to metal or the like and heated in situ thereupon.

HARVEY D. GEYER.